United States Patent [19]

Mauro

[11] Patent Number: 4,790,749

[45] Date of Patent: Dec. 13, 1988

[54] KILN FOR FIRING CERAMIC MATERIALS SUCH AS TILES AND THE LIKE

[75] Inventor: Poppi Mauro, Sassuolo, Italy

[73] Assignee: Poppi S.p.A., Castellarano, Italy

[21] Appl. No.: 131,831

[22] Filed: Dec. 11, 1987

[30] Foreign Application Priority Data

Oct. 30, 1987 [IT] Italy .................. 40147 A/86

[51] Int. Cl.⁴ ............................................. F27B 9/28
[52] U.S. Cl. .................................... 432/59; 432/152; 432/175; 432/246; 432/137
[58] Field of Search ............ 432/8, 59, 175, 246, 432/137, 147

[56] References Cited

U.S. PATENT DOCUMENTS

| 2,872,173 | 2/1959 | Munker | 432/8 |
| 3,744,963 | 7/1973 | Flynn | 432/59 |
| 3,825,406 | 7/1974 | Heath | 432/175 |
| 3,982,887 | 9/1976 | Kendziora et al. | 432/152 |
| 4,243,378 | 1/1981 | Chronberg | 432/246 |
| 4,373,702 | 2/1983 | Jaycraman et al. | 432/175 |
| 4,432,727 | 2/1984 | Fraioli | 432/175 |
| 4,474,552 | 10/1984 | Smith | 432/8 |

Primary Examiner—Henry C. Yuen
Attorney, Agent, or Firm—Fay, Sharpe, Beall, Fagan, Minnich & McKee

[57] ABSTRACT

In the modular kiln, which is designed for the firing of ceramic tiles etc., one has a series of single treatment zones (16) arranged in a continuous succession and interconnected by a conveyor (6); heat exchange is brought about by radiation between special surfaces built into the various zones of the kiln, and the material being fired.

20 Claims, 2 Drawing Sheets 4,790,749

KILN FOR FIRING CERAMIC MATERIALS SUCH AS TILES AND THE LIKE

BACKGROUND OF THE INVENTION

The invention relates to a kiln in which to fire ceramic materials such as tiles and the like.

Such a kiln is intended specifically, though not exclusively, for use in high speed firing processes effected on ceramic materials, and on ceramic tiles in particular. Conventional high speed firing cycles are implemented using continuous roller kilns, in which material is fired while running through from end to end; more exactly, with the kiln operating at regular tempo, a precise distribution of temperature is achieved along the longitudinal axis, from entry to exit.

This temperature appears as a continuous curve exhibiting an initial rise, an intermediate stretch, and a fall. Passing through the kiln, the material is subjected to a steadily increasing temperature while in the pre-heat zone, then to maximum firing temperature, and thereafter, to a relatively gradual cooling; in practical terms, the ceramic material is conveyed along the length of the kiln from entry to exit through a succession of zones, being invested with thermal energy in some, and divested of thermal energy in others. The method most widely adopted in bringing about such exchanges of heat in roller kilns is one based on convection, characterized by the creation of two continuous and colliding flow paths: on the one hand, the ceramic material being fired, which is carried forward into the firing zone by the rollers, and on the other, hot gases which pass from the firing zone out into the flue.

To obtain a given firing curve, different levels of thermal energy are applied in order to produce a break in the effects of the collision for a given space and hold one section of the kiln at constant temperature (the section in which the chemical and physical reactions relative to the firing process proper are allowed to take place).

This basic system of applying heat is beset by drawbacks deriving from the fact that, in passing through the kiln, the material encounters convection currents of dissimilar temperature, direction and rate of flow, and contact with the gases can only be considered nominally uniform at best.

A further drawback with such types of kiln is that treatment of the material cannot be modified during firing so as to produce particular effects, for example, such as those requiring special types of controlled atmosphere.

Accordingly, the object of the invention is to overcome the drawbacks and shortcomings discernable in prior art kilns as described above.

SUMMARY OF THE INVENTION

The stated object is achieved with a roller kiln as disclosed and claimed herein, which consists in a series of treatment zones corresponding in number to the number of characteristic thermal energy levels envisaged for a given firing process.

In embodiment, this signifies a succession of single modules that are rendered mechanically and thermally independent so that no one module can be influenced by another.

BRIEF DESCRIPTION OF THE DRAWINGS

The invention will now be described in detail, by way of example, with the aid of the accompanying drawings, in which.

DESCRIPTION OF THE PREFERRED EMBODIMENT

With reference to the drawings, 1 denotes a kiln (considered in its entirety) suitable for firing ceramic tiles 8 at high speed; the kiln comprises a series of sections, or treatment zones, arranged in succession and connected one to the next by way of a conveyor system consisting in a table 6 made up of a plurality of power driven rollers 7 disposed side by side with axes parallel in such a way as to form a continuous bed. Each such zone features a precise temperature level that will be observed in the graph of FIG. 2, in the case of the example illustrated; 'L' on the x axis, indicates the length of the kiln, and 'T', on the y axis, the temperature level.

Figures 1, 2:
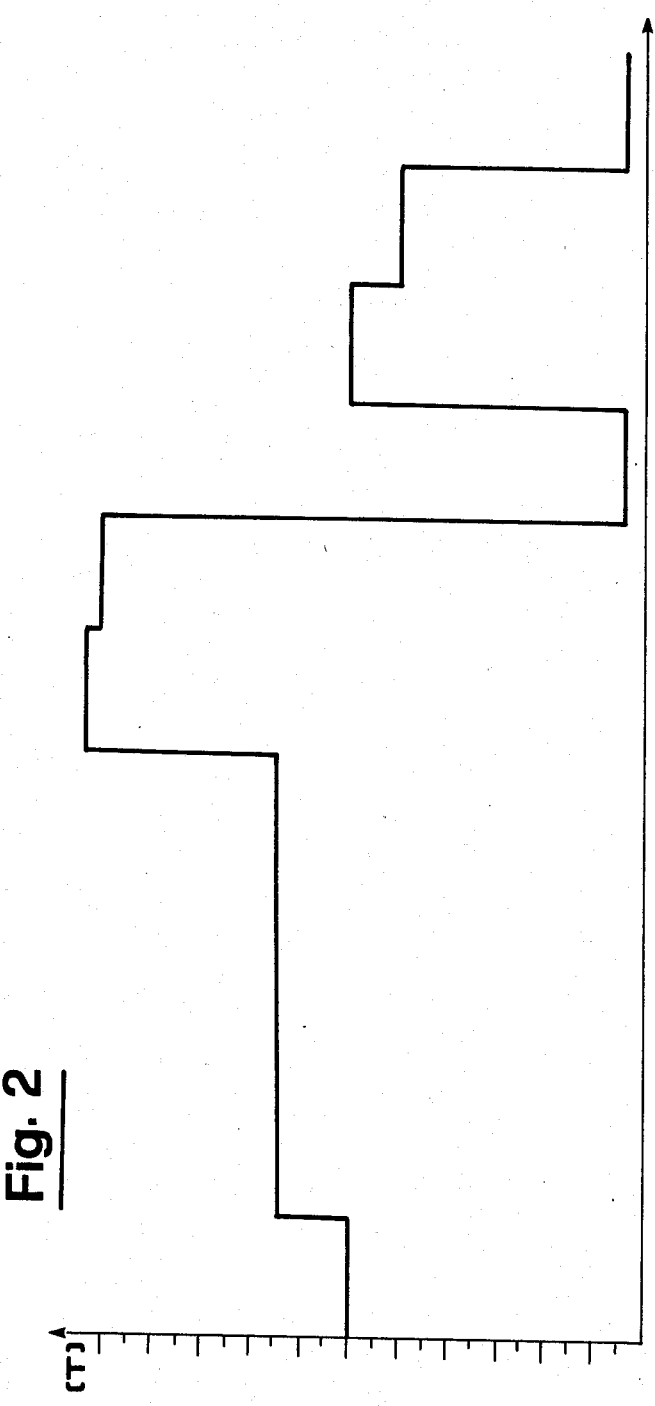
FIG. 1 is the schematic representation of a kiln according to the invention, viewed in longitudinal section through a vertical plane.
FIG. 2 shows an example of the firing curve obtained with the kiln of FIG. 1.
Figure 3:
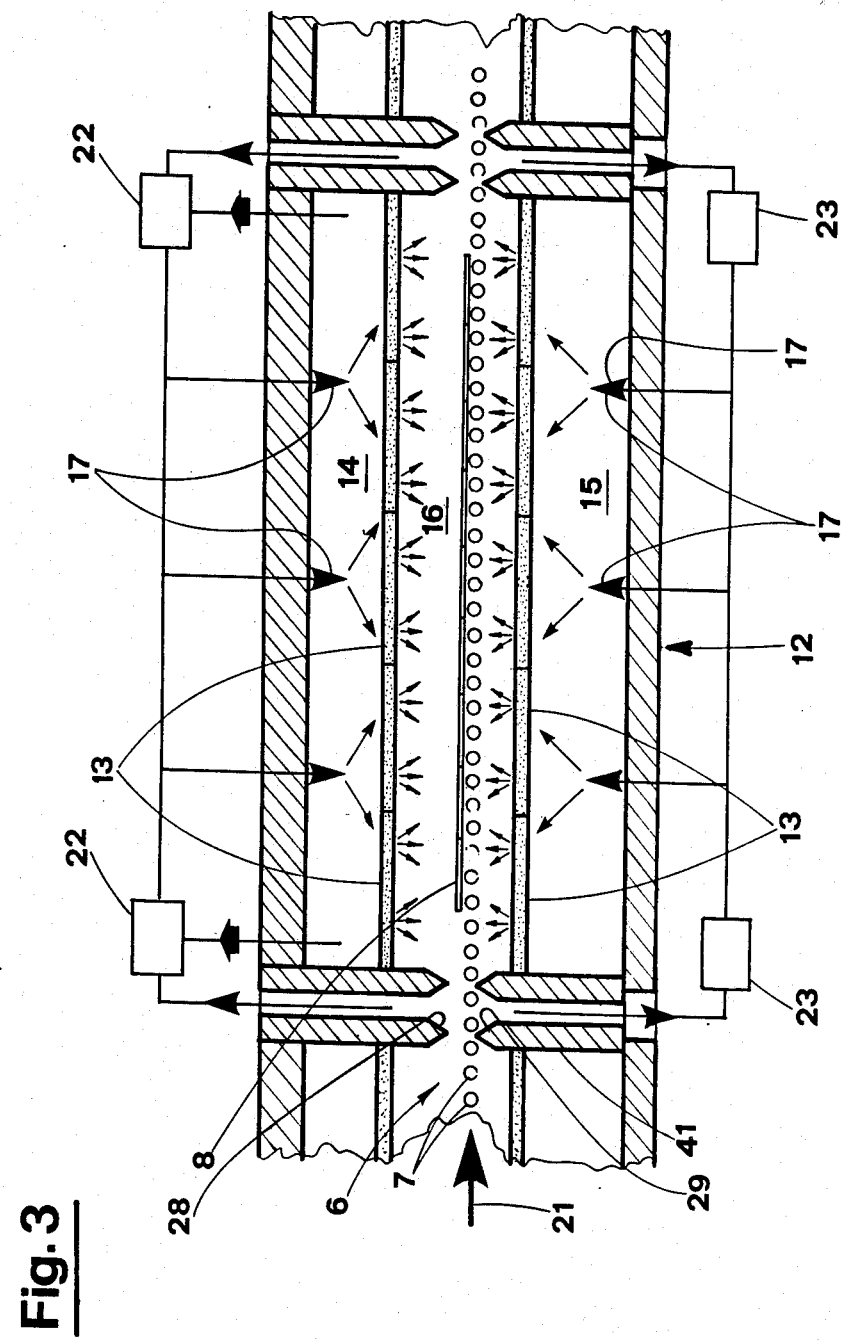
FIG. 3 illustrates a detail of the kiln, viewed in enlarged scale.

The single zones are thus identifiable from the relative temperature levels, and it will be seen in FIG. 1 that each such zone consists in at least one module, denoted 12, illustrated in detail in FIG. 3. 21 denotes the direction in which the tiles 8 are conveyed through the kiln, hence through the single treatment zone, or module 12. Tiles 8 sitting on the rollers 7 internally of the module 12 are in receipt of thermal energy radiated from surfaces located at given relative distances above and below the table 6. The radiating surfaces are embodied as panels 13 suspended side by side in a continuous succession, which feature high thermal conductivity and a high heat radiation coefficient, even at low temperatures.

The panels 13 are heated by burners 17, the hot gases from which are played onto their reverse sides (the side opposite from that offered to the rollers, in each case) internally of chambers 14 and 15 that are sealed off from the chamber 16 occupied by the roller table and tiles, i.e. the firing zone proper. Accordingly, heat exchange internally of the two sealed burner chambers 14 and 15 is effected partly by radiation, and partly by convection through the combustion gases from the burners 17, whereas in the firing zone 16, heat is transferred exclusively by radiation from the surfaces of the panels 13 to the tiles 8. Ready passage of heat from the gases to the panels 13 internally of the burner chambers 14 and 15 is enhanced by embodying the surfaces in contact with the gases in such a way as to gain a high heat exchange coefficient.

The circulation of air internally of the firing zone 16 is virtually nil, and interference with the corresponding zones of the modules fore and aft is therefore avoided. More exactly, the chamber 16 of a given module 12 is separated from those of the two modules on either side (see arrow 21) by thin voids, or suction vents 28 and 29; these are maintained at slightly negative pressure, and collect from points adjacent to the roller table 6 between one module and the next. A total separation is achieved between adjacent modules below the level of the rollers 7, as the position of the lower bulkheads 41 indicates, whereas above the level of rollers, one has a gap of dimensions such as to accommodate the thickness of the tile 8. The gap in question, which appears to allow communication between the firing zones 16 of adjacent modules by allowing a space for high speed passage of the tiles, is in effect closed by virtue of the negative pressure draught created through the vents 28 and 29.

Thermal energy held in the air taken out through the vents 28 and 29, and in the gases issuing from the burner chambers 14 and 15, is recaptured by heat recovery units 22 and 23 and reutilized in fuelling the burners 17.

With the firing chambers of adjacent modules 12 isolated in this way, interference is avoided, and a step of as much as several hundred degrees Celsius can be maintained between on modula and the next. This permits of effecting high speed firing cycles in which material is subjected to a given number of sharp rises or falls in temperature brought about in quick succession, each followed, if appropriate, by a period of stabilization; furthermore, one or more of the modules 12 making up the kiln can be utilized for firing in a controlled atmosphere.

In a kiln according to the invention, cooling can be effected in modules identical to those used for firing, in terms of basic embodiment; naturally enough, there will be no burners 17 fitted, and the direction of the heat exchange is inverted such that thermal energy passes from the hot tiles 8 to the panels 13, which will be maintained at a markedly lower temperature.

In alternative embodiments of the kiln 1, the single modules might be arranged in an uninterrupted succession, that is, not separated, but permitted to communicate freely and in direct fashion one with the next.

What is claimed:

1. A kiln for heat treating materials such as tiles, comprising:
    a plurality of heat treatment zones arranged in succession, at least one of said zones including a means for heating;
    a conveyor means for transferring a material which is to be heat treated from one heat treatment zone to another; and,
    a means for transmitting thermal energy in each of said heat treatment zones from a respective one of said means for heating, said means for transmitting comprising at least one non-porous panel having a heat radiating face directed at said conveyor means, said means for transmitting allowing only a radiant transfer of thermal energy to the material which is to be heat treated.

2. The kiln of claim 1 wherein said conveyor means comprises a roller table including a plurality of power driven rollers which are mounted on parallel axes.

3. The kiln of claim 1 wherein said means for transmitting comprises a plurality of panels located both above and below said conveyor means.

4. The kiln of claim 3 wherein said plurality of panels are suspended side by side such that their side edges are in contact with each other to present a continuous surface towards said conveyor means and form a chamber for holding said means for heating, wherein said means for heating comprises a burner, and wherein a hot gas from said burner is played onto a face of each panel opposite to said heat radiating face.

5. The kiln of claim 4 further comprising:
    a means for removing gases from said chamber holding said burner; and,
    a means for recovering heat from the gases removed from said chamber.

6. The kiln of claim 1 further comprising:
    a plurality of bulkheads, one separating each of said plurality of heat treatment zones from each adjacent heat treatment zone; and,
    a suction means provided in at least one of said bulkheads for withdrawing gas from adjacent said conveyor means.

7. The kiln of claim 6 wherein a plurality of panels are suspended in a side by side arrangement between each two bulkheads so as to present a continuous wall surface toward said conveyor means.

8. An apparatus for heat treating materials, comprising:
    a furnace including a plurality of heat treatment zones arranged in succession, at least one of said zones including a heater;
    a conveyor means for transferring a material that is to be heat treated through said furnace; and,
    a plurality of non-permeable panels which are interposed between said conveyor means and said heater, said panels being positioned in an edge-to-edge relationship so as to isolate said heater from the material being heat treated and allow only a radiant transfer of thermal energy, wherein one face of each panel serves as a heat radiating surface.

9. The apparatus of claim 8 further comprising a plurality of bulkheads, one separating each of said plurality of heat treatment zones from each adjacent heat treatment zone.

10. The apparatus of claim 9 further comprising:
    a suction means for withdrawing gas from adjacent said conveyor means; and,
    a means for recovering heat from the gas withdrawn.

11. The apparatus of claim 10 wherein one suction means is located in each of said bulkheads.

12. The apparatus of claim 8 wherein heaters are provided both above and below said conveyor means and wherein a plurality of panels are interposed between each heater and said conveyor means.

13. A kiln for firing ceramic materials such as tiles, comprising:
    a plurality of heat treatment zones arranged in succession and communicating freely with one another;
    a conveyor means for transferring a ceramic material to be heat treated through said plurality of heat treatment zones;
    a burner for providing heat in at least one of said heat treatment zones; and,
    a non-porous wall interposed between said burner and said conveyor means to prevent combustion gases from said burner from contacting the ceramic material to be heat treated, said wall assuring that all heat transfer to the ceramic material from said burner takes place by radiation.

14. The kiln of claim 13 wherein said wall comprises a plurality of panels positioned in an edge-to-edge relationship, wherein combustion gases from said burner can contact one face of each of said panels and an opposing face of each panel serves as a heat radiating surface, said panels having a high thermal conductivity and a high radiation coefficient, even at low temperatures.

15. The kiln of claim 13 further comprising a plurality of bulkheads, one separating each of said plurality of heat treatment zones from each adjacent heat treatment zone.

16. The kiln of claim 15 further comprising a suction means for withdrawing gases from adjacent said conveyor means.

17. The kiln of claim 16 further comprising a means for recovering heat from the gases withdrawn.

18. The kiln of claim 15 wherein said wall extends between two adjacent ones of said plurality of bulkheads to enclose the burner in a chamber and further comprising a means for removing gases from said chamber.

19. The kiln of claim 18 further comprising a means for recovering heat from the gases removed from the chamber.

20. The kiln of claim 13 wherein burners are provided both above and below said conveyor means and wherein a wall is interposed between each burner and said conveyor means.

* * * * *

UNITED STATES PATENT AND TRADEMARK OFFICE
CERTIFICATE OF CORRECTION

PATENT NO. : 4,790,749

DATED : December 13, 1988

INVENTOR(S) : Mauro Poppi

It is certified that error appears in the above—identified patent and that said Letters Patent is hereby corrected as shown below:

On the title page, under item [19]: the inventor's last name reading "Mauro" should read --Poppi--.

On the title page, column 1, line 5, "Poppi Mauro" should be --Mauro Poppi--

Signed and Sealed this

Third Day of October, 1989

Attest:

DONALD J. QUIGG

Attesting Officer

Commissioner of Patents and Trademarks